(12) United States Patent
Wiley et al.

(10) Patent No.: US 9,711,041 B2
(45) Date of Patent: Jul. 18, 2017

(54) N-PHASE POLARITY DATA TRANSFER

(71) Applicant: QUALCOMM Incorporated, San Diego, CA (US)

(72) Inventors: George Alan Wiley, San Diego, CA (US); Glenn D. Raskin, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 709 days.

(21) Appl. No.: 13/797,272

(22) Filed: Mar. 12, 2013

(65) Prior Publication Data
US 2013/0241759 A1 Sep. 19, 2013

Related U.S. Application Data

(60) Provisional application No. 61/612,174, filed on Mar. 16, 2012, provisional application No. 61/666,197, filed on Jun. 29, 2012.

(51) Int. Cl.
G08C 19/12 (2006.01)
G08C 19/16 (2006.01)
H04L 25/02 (2006.01)

(52) U.S. Cl.
CPC .......... *G08C 19/16* (2013.01); *H04L 25/0272* (2013.01)

(58) Field of Classification Search
CPC ........................................... G08C 19/16
USPC ........................................... 375/288
See application file for complete search history.

(56) References Cited

U.S. PATENT DOCUMENTS

| | | | |
|---|---|---|---|
| 3,866,147 A | 2/1975 | De Couvreur et al. | |
| 4,083,005 A | 4/1978 | Looschen | |
| 4,201,958 A | 5/1980 | Ahamed | |
| 4,280,221 A | 7/1981 | Chun et al. | |
| 4,355,310 A | 10/1982 | Belaigues et al. | |

(Continued)

FOREIGN PATENT DOCUMENTS

| CN | 1406008 A | 3/2003 |
|---|---|---|
| CN | 1871635 A | 11/2006 |

(Continued)

OTHER PUBLICATIONS

Hsueh, "Crosstalk Suppression Technique for Multi-Wire High-Speed I/O Links," ProQuest Dissertations and Theses; 2010; UCLA, 189 pages.

(Continued)

*Primary Examiner* — Amine Benlagsir
(74) *Attorney, Agent, or Firm* — Raphael Freiwirth

(57) ABSTRACT

System, methods and apparatus are described that facilitate transmission of data, particularly between two devices within an electronic apparatus. Data is selectively transmitted as N-phase polarity encoded symbols or as packets on differentially driven connectors. A data transfer method comprises encoding data and control signals in a sequence of symbols to be transmitted on a plurality of connectors, and transmitting the sequence of symbols on the plurality of connectors. Each symbol may be transmitted using a combination of a phase state of a first pair of connectors, a polarity of a second pair of connectors, and a selection of at least one undriven connector. Transmission of each symbol in the sequence of symbols may cause a change of state for at least one of the plurality of connectors.

40 Claims, 11 Drawing Sheets

(56) References Cited

U.S. PATENT DOCUMENTS

| | | |
|---|---|---|
| 4,468,787 A | 8/1984 | Keiper, Jr. |
| 4,475,212 A | 10/1984 | McLean et al. |
| 4,631,428 A | 12/1986 | Grimes |
| 4,910,750 A | 3/1990 | Fisher |
| 4,980,898 A | 12/1990 | Silvian |
| 5,160,929 A | 11/1992 | Costello |
| 5,166,956 A | 11/1992 | Baltus et al. |
| 5,259,002 A * | 11/1993 | Carlstedt ............... H03M 5/06 375/258 |
| 5,323,307 A | 6/1994 | Wolf et al. |
| 5,327,440 A | 7/1994 | Fredrickson et al. |
| 5,359,595 A | 10/1994 | Weddle et al. |
| 5,381,414 A | 1/1995 | Gibson |
| 5,461,379 A | 10/1995 | Weinman, Jr. |
| 5,563,526 A | 10/1996 | Hastings et al. |
| 5,664,948 A | 9/1997 | Dimitriadis et al. |
| 5,682,157 A | 10/1997 | Asmussen et al. |
| 5,687,326 A | 11/1997 | Robinson |
| 5,733,131 A | 3/1998 | Park |
| 5,809,519 A | 9/1998 | Lee |
| 5,852,630 A | 12/1998 | Langberg et al. |
| 5,939,939 A | 8/1999 | Gaynor et al. |
| 6,005,895 A | 12/1999 | Perino et al. |
| 6,081,513 A | 6/2000 | Roy |
| 6,091,709 A | 7/2000 | Harrison et al. |
| 6,175,319 B1 | 1/2001 | Schneider et al. |
| 6,243,761 B1 | 6/2001 | Mogul et al. |
| 6,256,509 B1 | 7/2001 | Tanaka et al. |
| 6,278,429 B1 | 8/2001 | Ruth et al. |
| 6,288,739 B1 | 9/2001 | Hales et al. |
| 6,317,465 B1 | 11/2001 | Akamatsu et al. |
| 6,346,832 B1 | 2/2002 | Young |
| 6,359,931 B1 | 3/2002 | Perino et al. |
| 6,430,196 B1 | 8/2002 | Baroudi |
| 6,452,420 B1 | 9/2002 | Wong |
| 6,504,875 B2 | 1/2003 | Perino et al. |
| 6,556,628 B1 | 4/2003 | Poulton et al. |
| 6,587,037 B1 | 7/2003 | Besser et al. |
| 6,611,503 B1 | 8/2003 | Fitzgerald et al. |
| 6,621,438 B1 | 9/2003 | Hong |
| 6,649,377 B1 | 11/2003 | Allard et al. |
| 6,654,565 B2 | 11/2003 | Kenny |
| 6,662,019 B2 | 12/2003 | Kamel et al. |
| 6,694,377 B1 | 2/2004 | Beyer |
| 6,703,868 B2 | 3/2004 | Savaria et al. |
| 6,703,949 B2 | 3/2004 | Greenstreet |
| 6,728,320 B1 | 4/2004 | Khasnis et al. |
| 6,778,493 B1 | 8/2004 | Ishii |
| 6,797,891 B1 | 9/2004 | Blair et al. |
| 6,813,638 B1 | 11/2004 | Sevanto et al. |
| 6,842,389 B2 | 1/2005 | Perner et al. |
| 6,865,610 B2 | 3/2005 | Bolosky et al. |
| 6,867,668 B1 | 3/2005 | Dagostino et al. |
| 6,891,899 B2 | 5/2005 | Hall et al. |
| 6,914,637 B1 | 7/2005 | Wolf et al. |
| 7,027,522 B2 | 4/2006 | Pickering et al. |
| 7,047,155 B2 | 5/2006 | Barrenscheen et al. |
| 7,072,406 B1 | 7/2006 | Haermae et al. |
| 7,106,276 B2 | 9/2006 | Akiyama |
| 7,113,550 B2 | 9/2006 | Stonecypher et al. |
| 7,142,612 B2 | 11/2006 | Horowitz et al. |
| 7,143,177 B1 | 11/2006 | Johnson et al. |
| 7,145,411 B1 | 12/2006 | Blair et al. |
| 7,154,418 B2 | 12/2006 | Lee |
| 7,167,527 B1 | 1/2007 | Park et al. |
| 7,224,737 B2 | 5/2007 | Voutilainen |
| 7,233,773 B2 | 6/2007 | Hansen et al. |
| 7,263,133 B1 | 8/2007 | Miao |
| 7,269,430 B2 | 9/2007 | Moorti et al. |
| 7,336,139 B2 | 2/2008 | Blair et al. |
| 7,339,502 B2 | 3/2008 | Furtner |
| 7,355,532 B2 | 4/2008 | Kim |
| 7,471,285 B2 | 12/2008 | Cheng et al. |
| 7,508,881 B2 | 3/2009 | Choi et al. |
| 7,529,957 B2 | 5/2009 | Krantz et al. |
| 7,539,882 B2 | 5/2009 | Jessup et al. |
| 7,626,442 B2 | 12/2009 | Zerbe et al. |
| 7,656,321 B2 | 2/2010 | Wang |
| 7,688,929 B2 | 3/2010 | Co |
| 7,692,563 B2 | 4/2010 | Hamada et al. |
| 7,697,628 B2 | 4/2010 | Choi |
| 7,826,551 B2 | 11/2010 | Lee et al. |
| 7,859,356 B2 | 12/2010 | Pandey |
| 8,024,477 B2 | 9/2011 | Rothman et al. |
| 8,027,405 B2 | 9/2011 | Den Ouden et al. |
| 8,064,535 B2 | 11/2011 | Wiley et al. |
| 8,320,494 B2 | 11/2012 | Zerbe et al. |
| 8,472,551 B2 | 6/2013 | Wiley |
| 9,369,237 B2 | 6/2016 | Wiley et al. |
| 9,496,879 B1 | 11/2016 | Duan et al. |
| 2002/0061072 A1 | 5/2002 | Pickering et al. |
| 2002/0064247 A1 | 5/2002 | Ahn et al. |
| 2002/0112070 A1 | 8/2002 | Ellerbrock et al. |
| 2002/0181618 A1 | 12/2002 | Muranaka |
| 2003/0095606 A1 | 5/2003 | Horowitz et al. |
| 2003/0117184 A1 | 6/2003 | Fecteau et al. |
| 2004/0039504 A1 | 2/2004 | Coffee et al. |
| 2004/0196076 A1 | 10/2004 | Ko |
| 2005/0012492 A1 | 1/2005 | Mihalka |
| 2005/0053171 A1 | 3/2005 | Pickering et al. |
| 2005/0144225 A1 | 6/2005 | Anderson et al. |
| 2005/0151868 A1 | 7/2005 | Fraenkel et al. |
| 2005/0156755 A1 | 7/2005 | Miller |
| 2005/0204057 A1 | 9/2005 | Anderson et al. |
| 2006/0034326 A1 | 2/2006 | Anderson et al. |
| 2006/0061494 A1 | 3/2006 | Hosaka et al. |
| 2006/0192697 A1 | 8/2006 | Quick et al. |
| 2006/0271678 A1 | 11/2006 | Jessup et al. |
| 2007/0009018 A1 | 1/2007 | Wang |
| 2007/0030881 A1 | 2/2007 | Nishio |
| 2007/0160155 A1 | 7/2007 | Choi |
| 2007/0164883 A1 * | 7/2007 | Furtner ............... G06F 13/4295 341/126 |
| 2007/0164884 A1 | 7/2007 | Ihs |
| 2007/0192541 A1 | 8/2007 | Balasubramonian et al. |
| 2008/0212709 A1 * | 9/2008 | Wiley ............... H04L 5/20 375/286 |
| 2008/0219252 A1 | 9/2008 | Narasimhaprasad |
| 2009/0082056 A1 | 3/2009 | Iwanaga et al. |
| 2009/0195699 A1 | 8/2009 | Hamada et al. |
| 2009/0225873 A1 | 9/2009 | Lee et al. |
| 2010/0027706 A1 | 2/2010 | Tanimoto et al. |
| 2010/0215118 A1 | 8/2010 | Ware et al. |
| 2010/0235673 A1 | 9/2010 | Abbasfar |
| 2010/0309964 A1 | 12/2010 | Oh et al. |
| 2011/0084737 A1 | 4/2011 | Oh et al. |
| 2011/0138210 A1 | 6/2011 | Belali et al. |
| 2011/0268225 A1 | 11/2011 | Cronie et al. |
| 2011/0294359 A1 | 12/2011 | Cho et al. |
| 2011/0299555 A1 | 12/2011 | Cronie et al. |
| 2011/0302478 A1 | 12/2011 | Cronie et al. |
| 2012/0051241 A1 | 3/2012 | Mori et al. |
| 2012/0230626 A1 | 9/2012 | Metz et al. |
| 2013/0051162 A1 | 2/2013 | Amirkhany et al. |
| 2013/0215991 A1 | 8/2013 | Wiley |
| 2013/0339507 A1 | 12/2013 | Wiley |
| 2014/0003543 A1 | 1/2014 | Wiley |
| 2014/0006649 A1 | 1/2014 | Wiley et al. |
| 2014/0112401 A1 | 4/2014 | Wiley et al. |
| 2014/0153665 A1 | 6/2014 | Wiley et al. |
| 2015/0074673 A1 | 3/2015 | Tohzaka et al. |
| 2015/0236844 A1 | 8/2015 | Pan et al. |
| 2015/0319013 A1 | 11/2015 | Wiley |
| 2016/0034416 A1 | 2/2016 | Chavez et al. |
| 2016/0036916 A1 | 2/2016 | Takeda et al. |
| 2016/0041941 A1 | 2/2016 | Kessler et al. |
| 2016/0099817 A1 | 4/2016 | Wiley et al. |
| 2016/0156457 A1 | 6/2016 | Wiley |

FOREIGN PATENT DOCUMENTS

| | | |
|---|---|---|
| CN | 101171776 B | 5/2011 |
| EP | 1207649 | 5/2002 |
| JP | 2002199032 A | 7/2002 |

(56) References Cited

FOREIGN PATENT DOCUMENTS

| WO | 9202988 A1 | 2/1992 |
| WO | 2005041164 | 5/2005 |
| WO | 2011134678 A1 | 11/2011 |
| WO | 2011151469 A1 | 12/2011 |
| WO | 2012089803 A2 | 7/2012 |

OTHER PUBLICATIONS

International Search Report and Written Opinion—PCT/US2013/030937—ISA/EPO—Jul. 4, 2013.
John Poulton, et al., "Multiwire Differential Signaling," UNC-CH Department of Computer Science, Version 1.1, Aug. 6, 2003.
Sevanto, J., "Multimedia messaging service for GPRS and UMTS", IEEE on WCNC, Sep. 1999, pp. 1422-1426, vol. 3.
Zheng, "Skew compensation techniques for multi-gigabit wire-line data communications," Dissertation, The University of Texas at Dallas, 2010, 126 pages.
Zogopoulos, "A Low-Power High-Speed Single-Ended Parallel Link Using Three-Level Differential Encoding," USC, Dissertation, May 2007, 92 pages.
Taiwan Search Report—TW102121240—TIPO—Feb. 13, 2014.

\* cited by examiner

| # wires | number of states | | | # wires | bits per symbol | | | # wires | bits per wire | | |
|---|---|---|---|---|---|---|---|---|---|---|---|
| | 1 pair | 2 pair | 3 pair | | 1 pair bits/sym | 2 pair bits/sym | 3 pair bits/sym | | 1 pair bits/wire | 2 pair bits/wire | 3 pair bits/wire |
| 2 | 2 | | | 2 | 0 | | | 2 | 0 | | |
| 3 | 6 | | | 3 | 2.32193 | | | 3 | 0.773976 | | |
| 4 | 12 | 6 | | 4 | 3.45943 | 2.32193 | | 4 | 0.864858 | 0.580482 | |
| 5 | 20 | 30 | | 5 | 4.24793 | 4.85798 | | 5 | 0.849586 | 0.971596 | |
| 6 | 30 | 90 | 20 | 6 | 4.85798 | 6.47573 | 4.24793 | 6 | 0.809663 | 1.079289 | 0.707988 |
| 7 | 42 | 210 | 140 | 7 | 5.35755 | 7.70736 | 7.11894 | 7 | 0.765365 | 1.101051 | 1.016992 |
| 8 | 56 | 420 | 560 | 8 | 5.78136 | 8.71081 | 9.1267 | 8 | 0.72267 | 1.088851 | 1.140838 |
| 9 | 72 | 756 | 1680 | 9 | 6.14975 | 9.56033 | | 9 | 0.683305 | 1.062259 | 1.190376 |
| 10 | 90 | 1260 | 4200 | 10 | 6.47573 | | 12.0358 | 10 | 0.647573 | 1.029806 | 1.205583 |

FIG. 5

N-PHASE POLARITY DATA TRANSFER

CLAIM OF PRIORITY UNDER 35 U.S.C. §119

The present application for patent claims priority to Provisional Application No. 61/612,174 entitled "N-Phase Polarity Data Transfer" filed Mar. 16, 2012, which is assigned to the assignee hereof, and to Provisional Application No. 61/666,197 entitled "N-Phase Polarity Output Pin Mode Multiplexer" filed Jun. 29, 2012, which is assigned to the assignee hereof, both of which applications are hereby expressly incorporated by reference herein.

BACKGROUND

Field

The present disclosure relates generally to high-speed data communications, and more particularly, to asymmetric communications between components of electronic devices and in particular to multi-phase encoding and decoding.

Background

High-speed interfaces are often limited by clock skew and are subject to interference. High frequency signals are often transmitted using differential interfaces to provide common-mode rejection for critical signals. In devices such as memory devices, which transmit and receive large amounts of data over wide data and control buses, interfaces maybe expensive and may consume significant power and real-estate on a circuit board.

SUMMARY

Embodiments disclosed herein provide systems, methods and apparatus for communicating between two devices that may be collocated in an electronic apparatus and communicatively coupled through one or more data links.

In an aspect of the disclosure, a data transfer method comprises encoding data and control signals in a sequence of symbols to be transmitted on a plurality of connectors, and transmitting the sequence of symbols on the plurality of connectors. Each symbol may be transmitted using a combination of a phase state of a first pair of connectors, a polarity of a second pair of connectors, and a selection of at least one undriven connector. Transmission of each symbol in the sequence of symbols may cause a change of state for at least one of the plurality of connectors.

In an aspect of the disclosure, a clock associated with the control and data signals is encoded in transmission timing of the sequence of symbols. The polarity of the second signal may be characterized as a voltage differential provided between the second pair of connectors and/or a direction of current flow through the second pair of connectors.

In an aspect of the disclosure, the plurality of connectors comprises at least some bidirectional connectors and data or control signals may be decoded from symbols received on the plurality of connectors.

In an aspect of the disclosure the method further comprises determining whether the display interface is configured for multi-phase polarity encoding, and transmitting the data and control signals as differential signals on the plurality of connectors if it is determined that the display interface is not configured for multi-phase polarity encoding. The sequence of symbols may be transmitted if it is determined that the display interface is configured for multi-phase polarity encoding.

In an aspect of the disclosure, an apparatus comprises means for encoding data and control signals in a sequence of symbols to be transmitted on a plurality of connectors, and means for transmitting the sequence of symbols on the plurality of connectors. Each symbol may be transmitted using a combination of a phase state of a first pair of connectors, a polarity of a second pair of connectors, and a selection of at least one undriven connector. Transmission of each symbol in the sequence of symbols may cause a change of state for at least one of the plurality of connectors.

In an aspect of the disclosure, an apparatus comprises a processing system configured to encode data and control signals in a sequence of symbols to be transmitted on a plurality of connectors, and transmit the sequence of symbols on the plurality of connectors. Each symbol may be transmitted using a combination of a phase state of a first pair of connectors, a polarity of a second pair of connectors, and a selection of at least one undriven connector. Transmission of each symbol in the sequence of symbols may cause a change of state for at least one of the plurality of connectors.

In an aspect of the disclosure, a processor-readable storage medium having one or more instructions. When executed by at least one processing circuit, the one or more instructions cause the at least one processing circuit to encode data and control signals in a sequence of symbols to be transmitted on a plurality of connectors, and transmit the sequence of symbols on the plurality of connectors. Each symbol may be transmitted using a combination of a phase state of a first pair of connectors, a polarity of a second pair of connectors, and a selection of at least one undriven connector. Transmission of each symbol in the sequence of symbols may cause a change of state for at least one of the plurality of connectors.

In an aspect of the disclosure, any undriven connectors may be driven to a mid-level amplitude using a termination at the driver.

BRIEF DESCRIPTION OF THE DRAWINGS

FIG. 5 illustrates multi-wire encoding capabilities for N-phase polarity data encoding.

DETAILED DESCRIPTION

Figure 1:
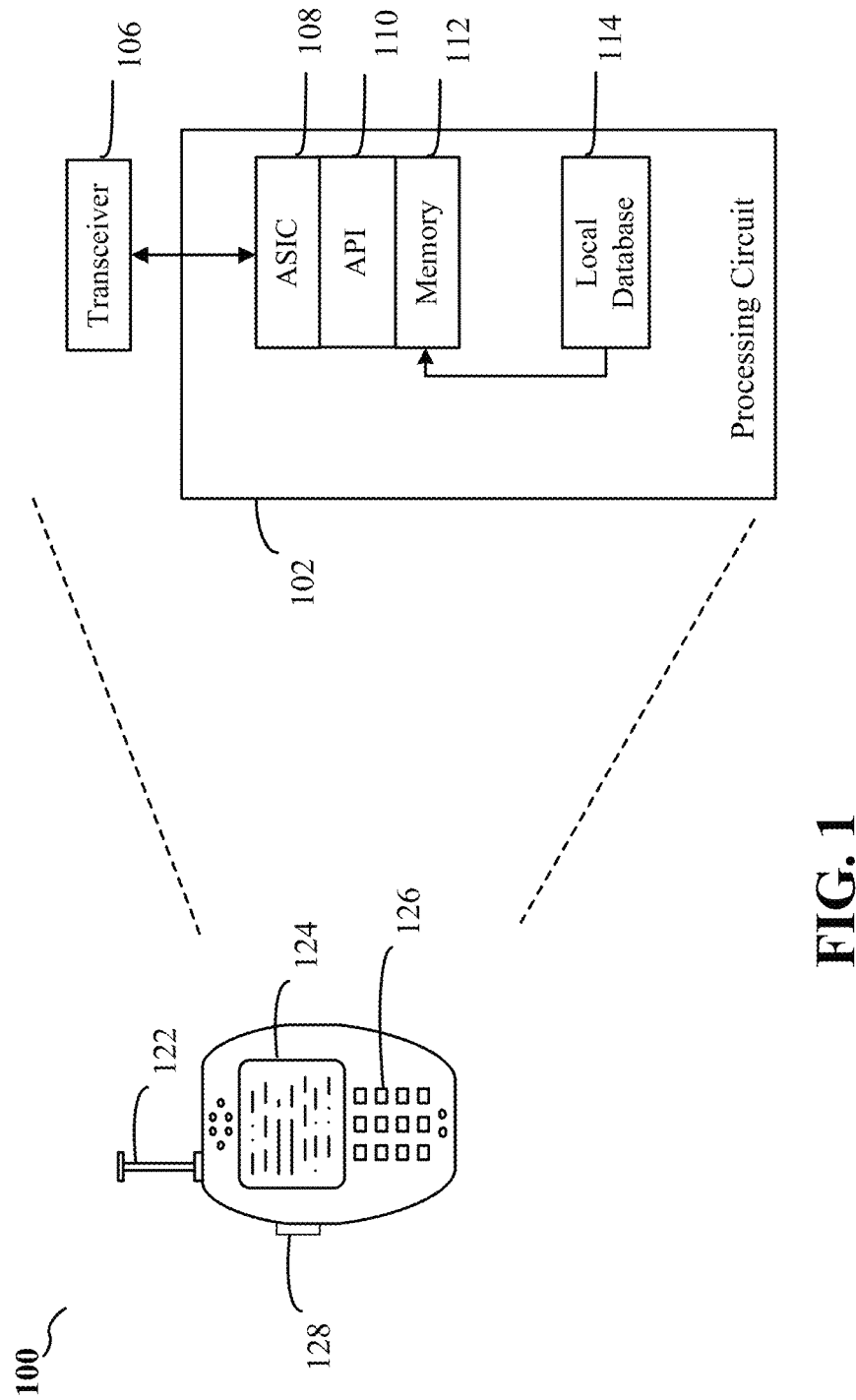
FIG. 1 depicts a system employing an N-phase polarity encoded data link between devices.

Various aspects are now described with reference to the drawings. In the following description, for purposes of explanation, numerous specific details are set forth in order to provide a thorough understanding of one or more aspects.

It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Certain disclosed embodiments relate to systems and apparatus that employ multi-phase data encoding and decoding methods involving a plurality of conductors (i.e., M conductors). The M conductors typically comprise three or more conductors, and each conductor may be referred to as a wire, although the M conductors may comprise conductive traces on a circuit board or within a conductive layer of a semiconductor integrated circuit (IC) device. The M conductors may be divided into a plurality of transmission groups, each group encoding a portion of a block of data to be transmitted. An N-phase encoding scheme is defined in which bits of data are encoded phase transitions and polarity changes on the M conductors. In one example, an N-phase encoding scheme for a 3-wire system may comprise three phase states and two polarities, providing 6 states and 5 possible transitions from each state. Deterministic voltage and/or current changes may be detected and decoded to extract data from the M conductors. Decoding does not rely on independent conductors or pairs of conductors and timing information can be derived directly from phase and/or polarity transitions in the M conductors. N-Phase polarity data transfer can be applied to any signaling interface, such as electrical, optical and radio frequency (RF) interfaces, for example.

Certain embodiments of the invention may be applicable to communications links deployed between electronic components that may include subcomponents of a device, such as telephone, mobile computing device, appliance, automobile electronics, avionics systems, etc. Referring to FIG. 1, for example, an apparatus 100 employing M-wire, N-phase encoding may comprise a processing circuit 102 that is configured to control operation of the apparatus 100. Processing circuit 102 may access and execute software applications and control logic circuits and other devices within the apparatus 100. In one example, apparatus 100 may comprise a wireless communication device that communicates through an RF transceiver with a radio access network (RAN), a core access network, the Internet and/or another network. Apparatus 100 may include a communications transceiver 106 operably coupled to processing circuit 102. Processing circuit 102 may comprise one or more IC devices, such as an application specific IC (ASIC)108. ASIC 108 may include one or more processing devices, logic circuits, and so on. Processing circuit 102 may include and/or be coupled to processor readable storage 112 that may maintain instructions and data the may be executed by processing circuit 102. Processing circuit 102 may be controlled by one or more of an operating system and an application programming interface (API) 110 layer that supports and enables execution of software modules residing in storage 112 of the wireless device. Storage 112 may comprise read-only or random-access memory (RAM and ROM), EEPROM, flash cards, or any memory common to computer platforms. Processing circuit 102 may include or access a local database 114 that can maintain operational parameters and other information used to configure an operate apparatus 100. Local database 114 may be implemented using one or more of flash memory, magnetic media, EEPROM, optical media, tape, soft or hard disk, or the like. The processing circuit may also be operably coupled to external devices such as antenna 122, display 124, operator controls, such as button 128 and keypad 126 among other components.

Figure 2:
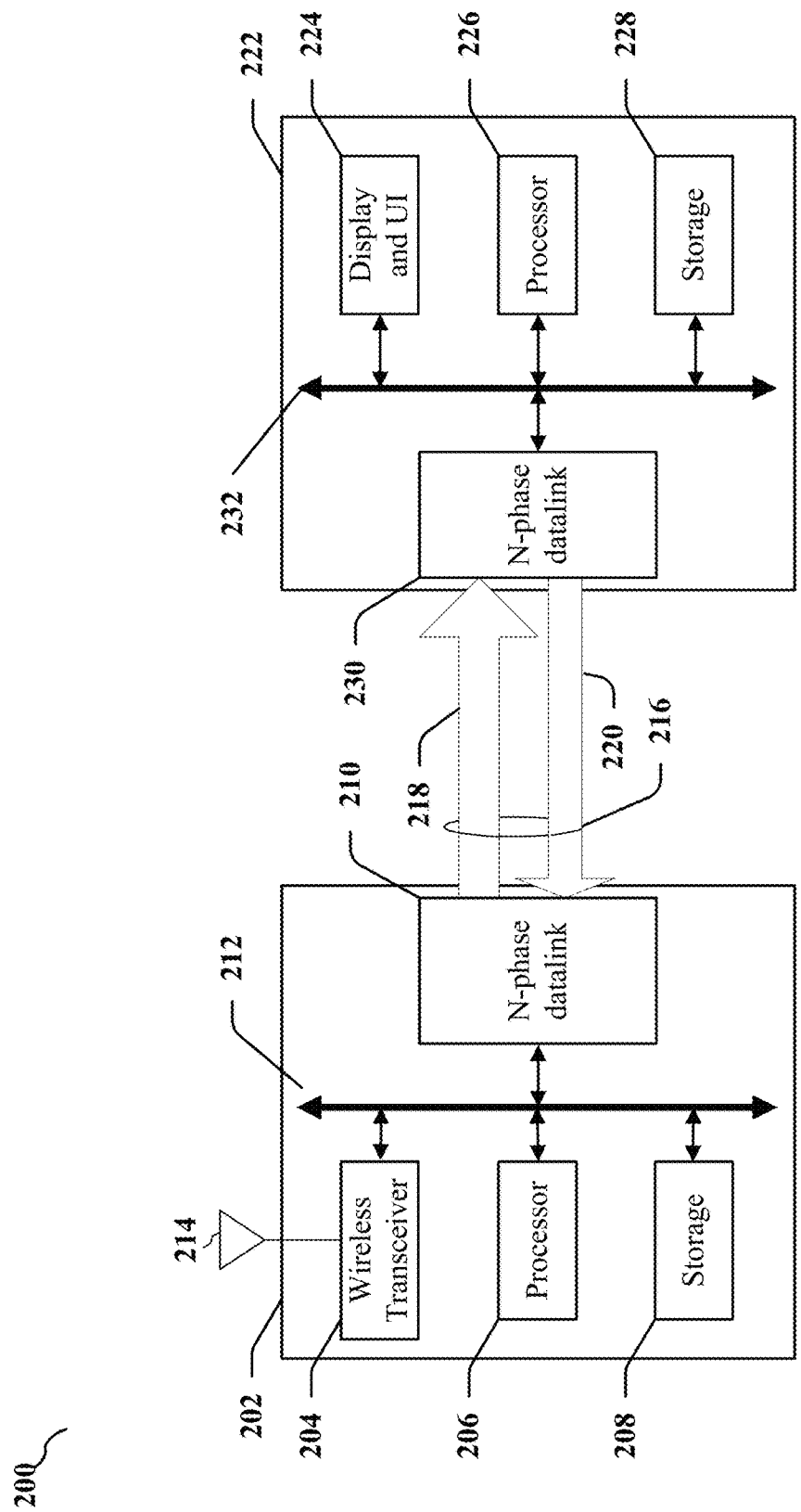
FIG. 2 illustrates a system architecture for an apparatus employing an N-phase polarity encoded data link.

FIG. 2 is a block diagram illustrating an embodiment in which a communication link 216 is used to connect components 202 and 222 of an apparatus 200, In the example, apparatus 200 may comprise a mobile computing system, a wireless telephone, notebook computer, tablet computing device, media player, gaming devices, or the like. Communications link 216 may be bidirectional and/or asymmetrical, and may comprise forward data link 218 and reverse data link 220. In one example, the forward link 218 may comprise a high-speed link communicating data from first processing device 202 to a second processing device 222. Forward link 218 may comprise a wired bus having a plurality of signal wires, each carrying N-phase encoded data.

First processing device 202 may perform core functions of the apparatus 200, including maintaining wireless communications through wireless transceiver 204 and antenna 214, while second processing device 222 may support a user interface 224, including one or more of a keyboard 226, a voice-recognition component, other input devices and output devices including user display 124 and associated drivers that may support displays such as a liquid crystal display (LCD) panel, touch-screen display, indicators and so on. User interface 224 may provide audio input and output. Storage 208 and 228 may comprise transitory and/or non-transitory storage operable to maintain instructions and data used by respective processors 206 and 226. Communication between processors 206 and 226, storage 208 and 228 and other devices 204, 210, 224 and 230 may be facilitated by one or more bus 212 and 232. In some embodiments buses 212 and/or 203 may comprise portions employing M-wire, N-phase encoding techniques. In one example, first processing system 202 may be designated as a host system, or transmitter, while second processing system 222 may be designated as a client system or receiver.

Reverse link 220 may operate at the same manner as forward link 218, and reverse link 220 may be capable of transmitting at a comparable speed or at a lower speed than forward link 218. In one example, second processing system 202 may employ reverse link 220 to communicate control, command and other information between the first processing device 202 and the second processing device 222. The forward and reverse data transmission rates may be substantially the same or differ by orders of magnitude, depending on the application. In one example, forward link 218 and reverse link 220 employ M-wire, N-phase encoding interfaces. Forward link 218 and/or reverse link 220 may be bidirectional. In some applications a single bidirectional link 218 or 220 may support communications between first processing device 202 and the second processing device 222.

In some embodiments, the reverse link 220 derives a clocking signal from the forward link 218 for synchronization purposes, for control purposes, to facilitate power management and/or for simplicity of design. The clocking signal may have a frequency that is obtained by dividing the frequency of a symbol clock used to transmit signals on the forward link 218. Symbol clock may be superimposed or otherwise encoded in symbols transmitted on forward link 218. The use of a clocking signal that is a derivative of the symbol clock allows fast synchronization of transmitters and receivers (transceivers 210, 230) and enables fast start and stop of data signals without the need for framing to enable training and synchronization.

In one example, one or more of buses 212 and/or 232 may provide access to double data rate (DDR) synchronous dynamic random access memory (SDRAM) using M-wire, N-phase encoding technique. N-phase polarity encoding devices 210 and/or 230 can encode multiple bits per transition, and multiple sets of wires can be used to transmit and receive data from the SDRAM, control signals, address signals, and so on.

In another example, communication link 216 comprises a high-speed digital interface, such as a mobile display digital interface (MDDI), and one or more data links 218 and 220 may use N-phase polarity encoding. Transceivers 210 and 230 may encode and decode data transmitted on link 216. The use of N-phase polarity encoding provides high speed data transfer and may consume half or less of the power of other interfaces because fewer drivers are active in N-phase polarity encoded data links 216. N-phase polarity encoding devices 210 and/or 230 can encode multiple bits per transition on the interface, which may comprise a bus. In one example, a combination of 3-phase and polarity encoding may be used to support a wide video graphics array (WVGA) 80 frames per second LCD driver IC without a frame buffer, delivering pixel data at 810 Mbps for display refresh.

Figure 3:
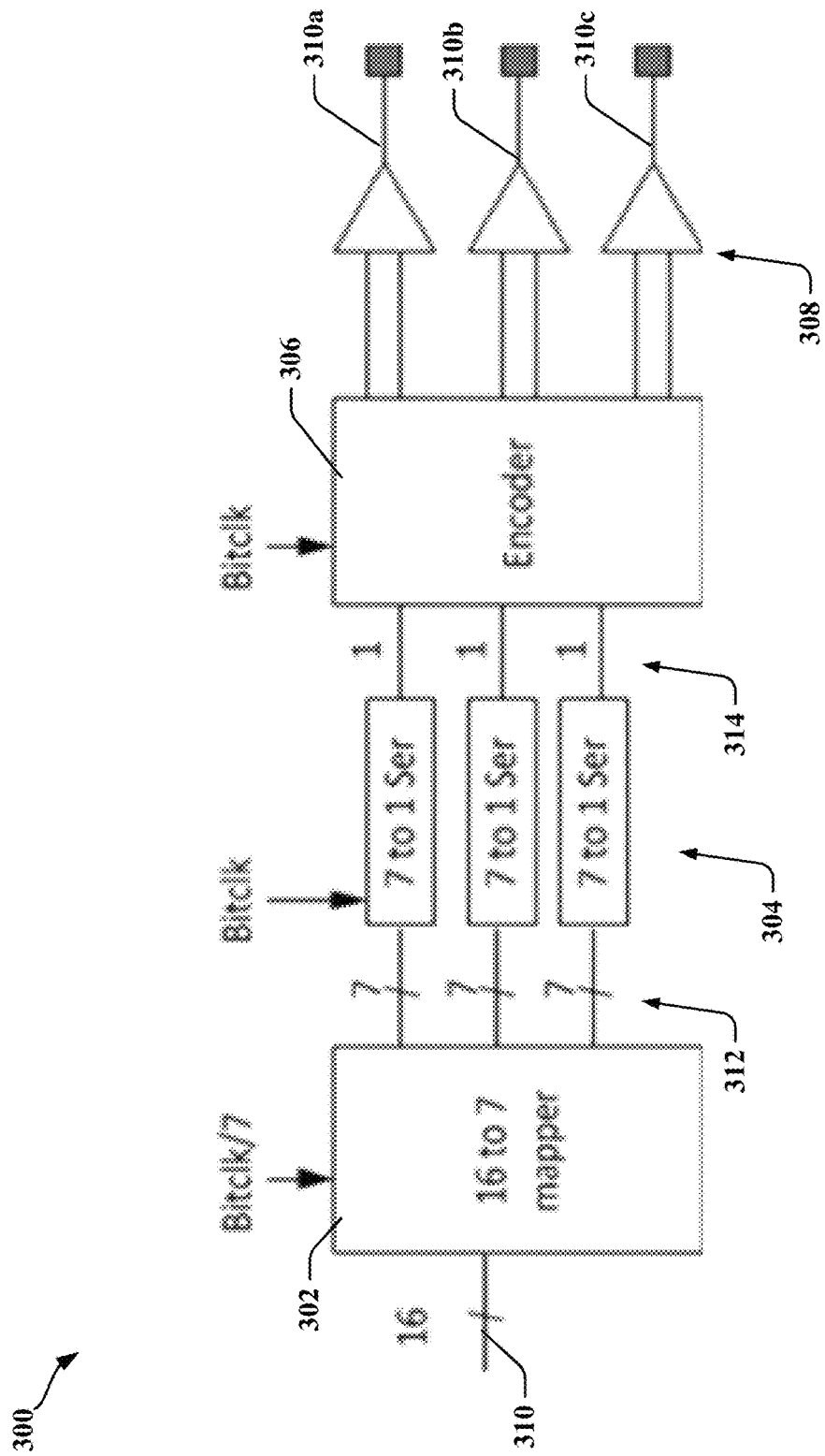
FIG. 3 illustrates a 3-phase polarity data encoder.

FIG. 3 is a diagram 300 illustrating an example of an M-wire, N-phase polarity encoding transmitter configured for M=3 and N=3. The example of 3-wire, 3-phase encoding is selected solely for the purpose of simplifying descriptions of certain aspects of this disclosure. The principles and techniques disclosed for 3-wire, 3-phase encoders can be applied in other configurations of M-wire, N-phase polarity encoders.

When N-phase polarity encoding is used, connectors such as signal wires 310a, 310b and 310c on an N-line bus may be undriven, driven positive, or driven negative. An undriven signal wire 310a, 310b or 310c may be in a high-impedance state. An undriven signal wire 310a, 310b or 310c may be driven to a voltage level that lies substantially halfway between the positive and negative voltage levels provided on driven signal wires. An undriven signal wire 310a, 310b or 310c may have no current flowing through it. In the example shown at 300, each signal wire 310a, 310b and 310c may be in one of three states (denoted as +1, −1, or 0) using drivers 308. In one example, drivers 308 may comprise unit-level current-mode drivers. In another example, drivers 308 may drive opposite polarity voltages on two signals 310a and 310b while the third signal 310c is at high impedance and/or pulled to ground. For each transmitted symbol interval, at least one signal is in the undriven (0) state, while the number of signals driven positive (+1 state) is equal to the number of signals driven negative (−1 state), such that the sum of current flowing to the receiver is always zero. For each symbol, the state of at least one signal wire 310a, 310b or 310c is different changed from the symbol transmitted in the preceding transmission interval.

In the example depicted at 300, 16 bit data 310 is input to a mapper 302, which maps the input data 310 to 7 symbols 312 that for transmitting sequentially over the signal wires 310a, 310b and 310c. The 7 symbols 312 may be serialized using parallel-to-serial converters 304, for example. An M-wire, N-phase encoder 306 receives 7 symbols 312 produced by the mapper one symbol at a time and computes the state of each signal wire 310a, 310b and 310c for each symbol interval. The encoder 306 selects the states of the signal wires 310a, 310b and 310c based on the input symbol and the previous states of signal wires 310a, 310b and 310c.

The use of M-wire, N-phase encoding permits a number of bits to be encoded in a plurality of symbols where the bits per symbol is not an integer. In the simple example of a 3-wire system, there are 3 available combinations of 2 wires which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_2(5) \approx 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
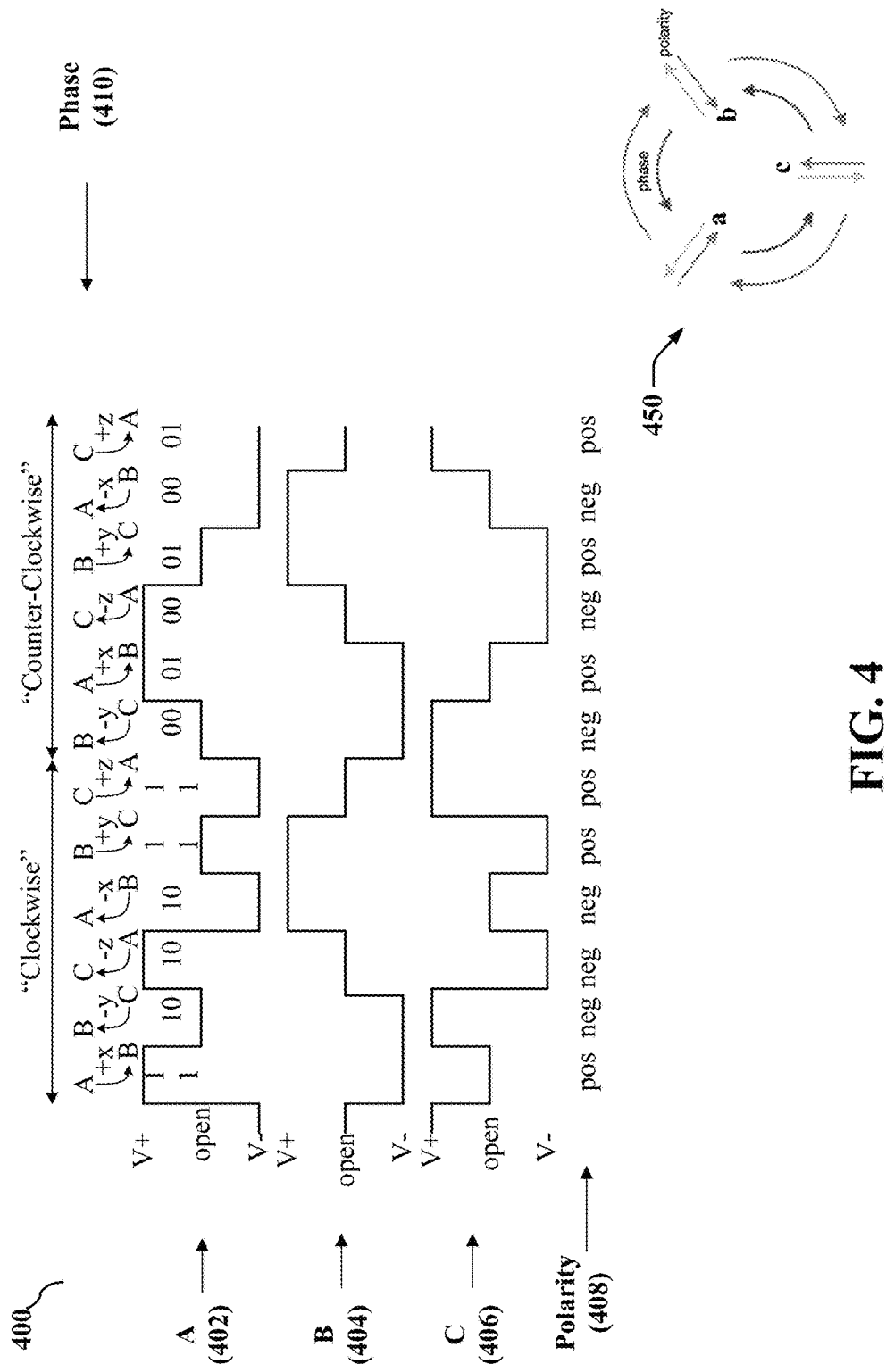
FIG. 4 illustrates N-phase polarity data encoding in a 3-wire 3-phase polarity encoded interface.

FIG. 4 illustrates an example of signaling 400 employing a three-phase modulation data-encoding scheme based on the circular state diagram 450. According to the data-encoding scheme, a 3-phase signal may rotate in two directions and may be transmitted on three conductors (A, B and C) 402, 404 and 406. The three signals carried by conductors 402, 404 and 406 that make up the 3-phase signal are independent, with each signal being 120 degrees out of phase relative to the remaining two. At any point in time, each of the 3 wires is in a different state (−1, 0, +1) from the other 2 wires. The encoding scheme also encodes information in polarity of the two of the conductors 402, 404 and 406 that are actively driven to a positive and negative level. Polarity is indicated at 408 for the sequence of states depicted.

At any time in a 3-wire implementation, exactly two of conductors A, B, and C carry a signal, and the data encoding states may be defined in terms of voltage difference or current flow between conductors. As shown in the state diagram 450, three phase states (corresponding respectively to states a, b, c) are defined with signal flow from A to B, B to C, and C to A in one direction, for example. Transitions between the three states are then defined according to state diagram 450 to ensure circular state transitions. In one embodiment, clockwise rotation (A to B) to (B to C), (B to C) to (C to A), and (C to A) to (A to B) at state transitions may be used to transmit a logic 1, while counter-clockwise rotations (B to C) to (A to B), (A to B) to (C to A), and (C to A) to (B to C) at state transitions may be used to transmit a logic 0. It is also noted that only one of states (A to B), (B to C), and (C to A) can be true at any time. Accordingly a bit may be encoded at each transition by controlling whether the signal is "rotating" clockwise or counter-clockwise. In one example, direction of rotation may be determined based on which of the 3 wires is undriven after the transition.

Information may also be encoded in polarity of the driven signal wires or direction of current flow between two signal wires. Signals 402, 404, and 406 illustrate voltage levels applied to conductors A, B, and C, respectively at each phase state. At any time, a first conductor is coupled to a positive voltage (+V, for example), a second conductor is coupled to a negative voltage (−V, for example), while the remaining third conductor is open circuited. As such, one polarity encoding state may be determined by the current flow between the first and second conductors or the voltage polarities of the first and second conductors. In some embodiments, two bits of data may be encoded at each phase transition. A decoder may determine rotation to obtain the first bit, and the second bit may be determined based on the polarity. The decoder having determined direction of rotation can determine the current phase state and the polarity of the voltage applied between the two active connectors 402, 404 and/or 406, or the direction of current flow through the two active conductors 402, 404 and/or 406.

As disclosed herein, one bit of data may be encoded in the rotation, or phase change in a 3-wire, 3-phase encoding system, and an additional bit may be encoded in the polarity of the two driven wires. Certain embodiments, encode more than two bits in each transition of a 3-wire, 3-phase encoding system by allowing transition to any of the possible states from a current state. Given 3 rotational phases and two polarities for each phase, 6 states are defined, such that 5 states are available from any current state. Accordingly, there may be $\log_2(5) \cong 2.32$ bits per symbol (transition) and the mapper may accept a 16-bit word and convert it to 7 symbols.

N-Phase data transfer may use more than three wires provided in a communication medium, such as a bus. The use of additional signal wires that can be driven simultaneously provides more combinations of states and polarities and allows more bits of data to be encoded at each transition between states. This can significantly improve throughput of the system, and reduce the power consumption over approaches that use multiple differential pairs to transmit data bits, while providing increased bandwidth.

In one example, an encoder may transmit symbols using 6 wires with 2 pairs of wires driven for each state. The 6 wires may be labeled A through F, such that in one state, wires A and F are driven positive, wires B and E negative, and C and D are undriven (or carry no current). For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| A B C D | A B C E | A B C F | A B D E | A B D F |
|---------|---------|---------|---------|---------|
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may comprise:
++−− +−−+ +−+− −+−+ −++− −−++

Accordingly, the total number of different states may be calculated as 15×6=90.

To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right)$$

FIG. 5 provides a chart 500 that shows bit encoding for various values of M (i.e. number of wires) and configurations of wires and wire pairs.

In some embodiments, an encoder may be configured to increase the number of wires used for N-phase encoding when increased bandwidth is required. Bandwidth may change when, for example, a video clip is to be displayed to a user of apparatus 100. Changes in bandwidth may correspond or relate to power control measures as well as specific application needs. For example, apparatus 200 may initiate power-saving measures to conserve battery lifetime and the bandwidth available may be curtailed accordingly.

When increased or decreased bandwidth is required or requested, an encoder may increase or decrease the number of active conductors to be used for N-phase encoding. Such adaptive encoding can enable a power-efficient provision of variable bandwidth. In one example, additional wires can be added in atomic units. An atomic unit may comprise three wires that employ 3-phase, polarity encoding (described herein). In another example, additional encoding states may be defined by adding pairs of wires to an M-wire, M-phase bus. In another example, additional encoding states may be obtained by adding a single wire, whereby two wires are undriven for each state. Addition of an undriven wire may increase power consumption less than adding a pair of driven wires.

Figure 6:
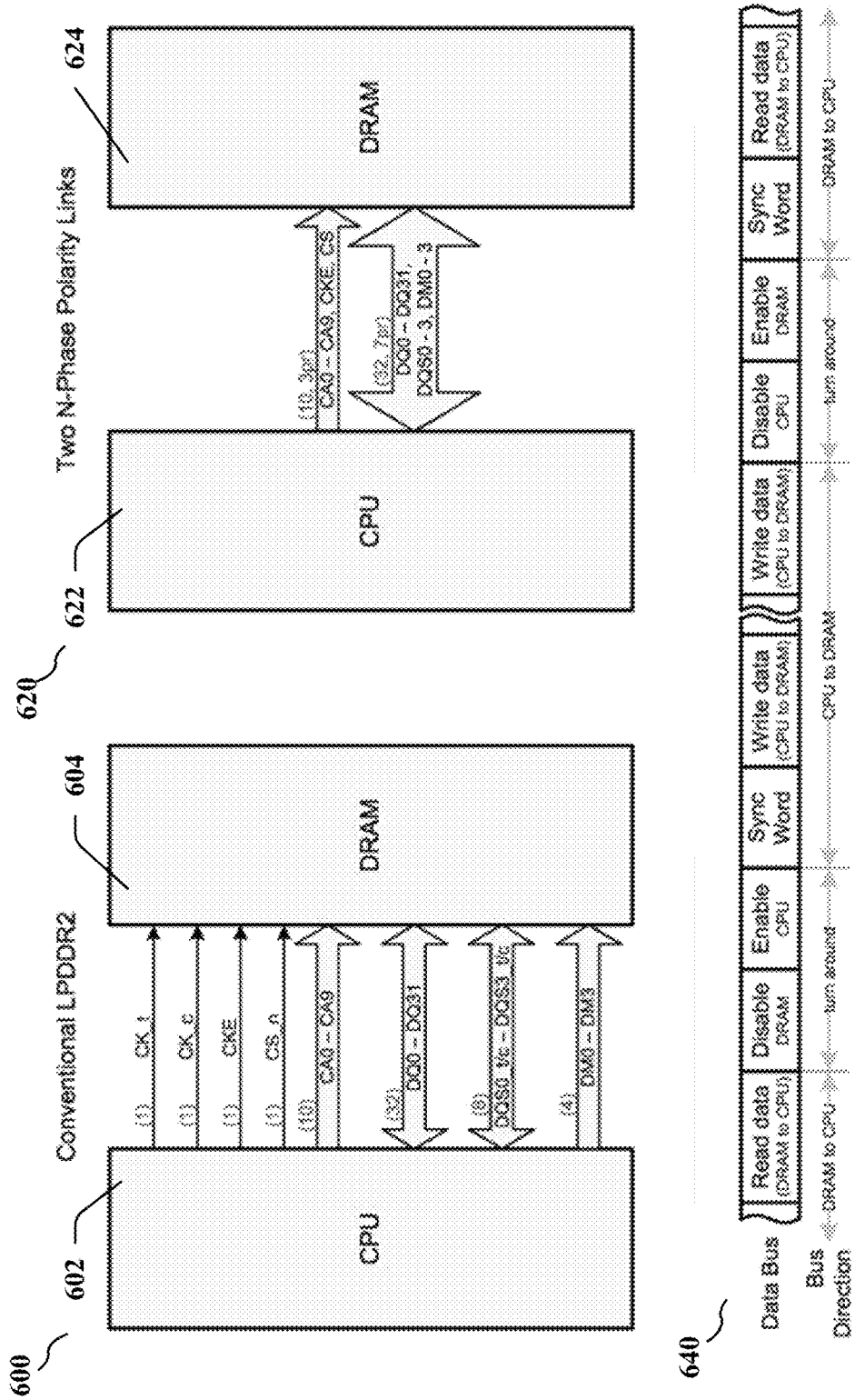
FIG. 6 illustrates an example of an application of N-phase polarity data encoding.

FIG. 6 is a block schematic illustrating an example of an application of M-wire N-phase encoding. In a conventional system 600, a CPU 602 may require 58 or more signal interconnects to operate a DRAM 604. In a system 620 that uses one of the encoding schemes described herein, the CPU 622 requires only 42 signal wires to interconnect with a DRAM 624, which may comprise a low-power DDR SDRAM 624. N-Phase Polarity encoding may be used to improve performance of the interface between CPU 622 and DRAM 624. The improvements may provide one or more of an increase in maximum speed, a reduction in the number of signals required, and a reduction in power consumption of the interface.

When replacing conventional signals with an N-Phase Polarity interface, similar types of signals may be grouped together in a single bus. For example, one grouping comprising clock, clock enable, chip selects and address-command bus may be transmitted in a single 10-wire N-Phase Polarity encoded bus. The mapping function may map one link symbol to one 12-bit word. The DRAM interface clock signal may be implicitly transmitted as the derived symbol clock of the N-Phase Polarity encoded bus that conveys the timing required to properly receive the symbols encoding DRAM control and address signals.

Signals related to the data bus of a DRAM 624 may be clustered together on a second N-Phase Polarity encoded bus, or on multiple encoded bus portions or on independently encoded buses depending on the width of the conventional data bus between CPU 602 and DRAM 604. In one example a 32-wire N-Phase Polarity link capable of carrying 40 data bits and associated signals comprises the data bus (DQ0-DQ31), data strobe (DQS0_t-DQS3_t, and DQS0_c-DQS3_c) and data mask (DM0-DM3). Data strobe signals are defined as differential signals for some devices 604, 624, including low-power DDR2 (LPDDR2) devices, but these signals may be transmitted as a single signal on the N-Phase Polarity link, because common-mode noise rejection is provided by the nature of the N-Phase Polarity encoding used for the link. In this case, the mapping function 302 may map one link symbol to one 40-bit word (for 32-bit data, 4-bit strobe, and 4-bit mask). If a wider memory bus is required then multiple copies of the 32-bit bus can be used. In some embodiments, a single N-Phase Polarity link capable of carrying 80 signals may be used to further reduce the total number of bus wires required, although a more complex mapper 302 may be required. Timing used to receive the data-related signals may be derived from the recovered clock of the data-bus N-Phase Polarity link.

DQ0-DQ31 are typically bidirectional signals, as are the strobe signals DQS0-DQS3. The mask signals DM0-DM3 may be defined as unidirectional from the CPU 622 to DRAM 624 for LPDDR2 interface, and these signals can be driven to a constant value (such as zero) when the bus is turned for DRAM 624 to CPU 622 communication, when reading from DRAM 624. In some embodiments, an N-Phase Polarity link can start and stop quickly, since link timing is derived from the guaranteed state transitions of the link symbol data. A short dead time may be provided for link turn-around and a synchronization word may be transmitted as the first symbol after changing direction to ensure the system is properly extracting clock timing and receiving commands. The synchronization word is typically intercepted and discarded by the link interface. An example of high-level timing is shown in the timing diagram 640, which illustrates data link changes in direction from read to write.

The timing of certain LPDDR2 signals may not be directly emulated in an N-Phase Polarity encoded link, including asynchronous signals or signals that are timed from another signal rather than having a relationship to the clock signal or specific number of bus clock cycles. One example is the LPDDR2 set-up and hold time with respect to data specified for data strobes. The time characteristics of these signals may be adapted slightly since it can be said that the signals arrive aligned perfectly in time with respect to other signals arriving in the same N-Phase Polarity encoding symbol interval.

The use of M-wire N-Phase Polarity encoding permits scalability and enables much higher bus speeds. One N-Phase Polarity symbol can carry control and data conventionally transmitted in one LPDDR2 cycle in half of an LPDDR2 clock cycle. N-Phase Polarity encoding is not typically afflicted by clock skew with respect to the bus signals, because clock signaling is encoded in the data symbols. By encoding clock signals in the data symbols, systems that employ M-wire N-Phase Polarity encoding can avoid the need to employ complex skew control methods, and can further avoid limiting maximum link speed based on practical limitations of clock-data alignment. Accordingly, the M-wire, N-phase polarity encoding systems and methods described herein may be scaled to accommodate significantly higher transfer speeds, and thereby accommodate later generations of SDRAM and other devices.

The bus widths described in relation to FIG. 6 are intended to serve as an example. A large range of numbers of wires and configuration of pairs of wires may be used.

Figure 7:
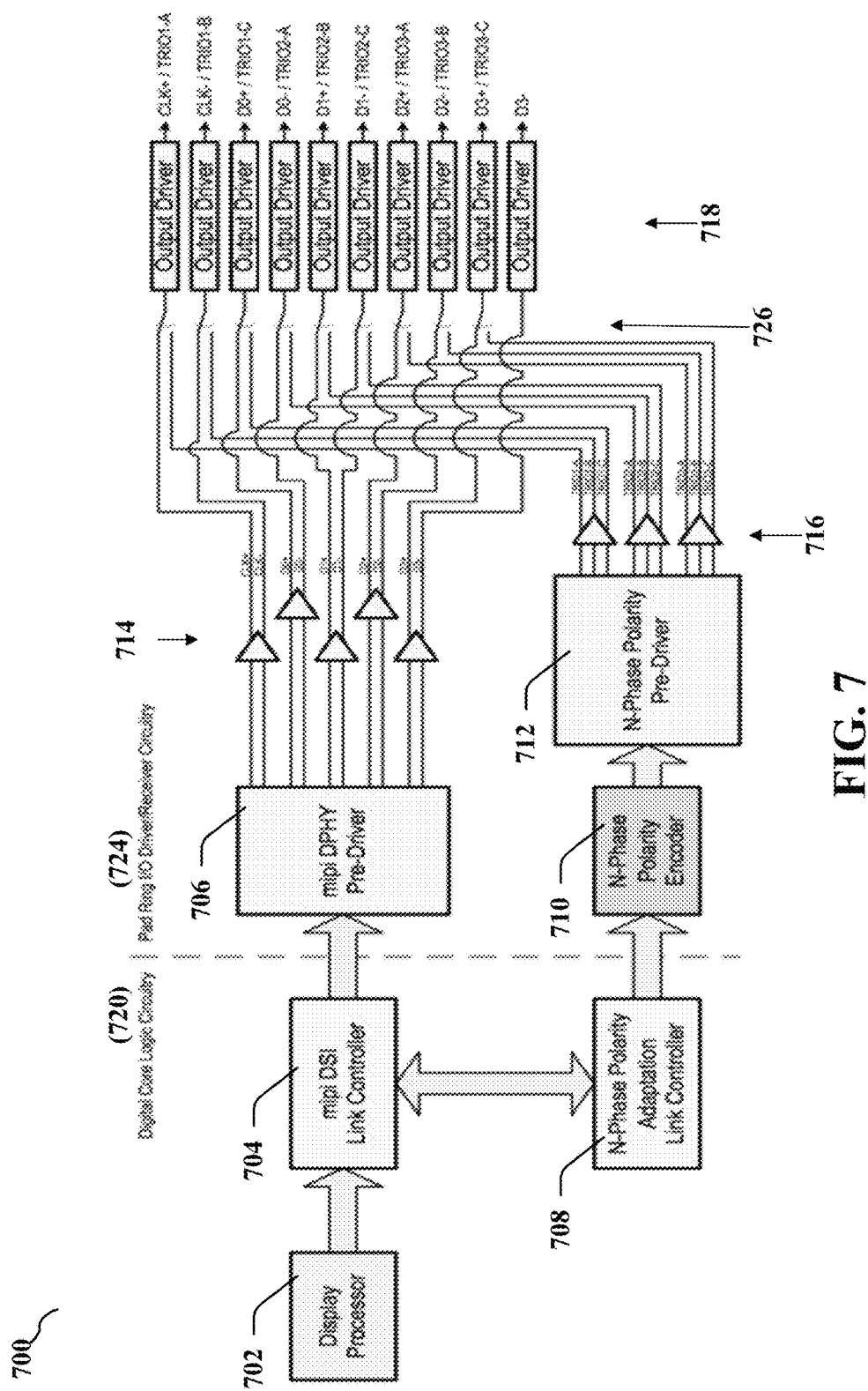
FIG. 7 illustrates a system architecture for an apparatus that may selectively use N-phase polarity encoding or differential signaling.

Certain embodiments provide a configurable interface that can selectively activate a desired number of wires to communicate data, and/or to reconfigure an M-wire, N-Phase Polarity encoded interface to serve as a simple differential interface. FIG. 7 illustrates an example in which mobile platform 700 employs pin multiplexing to reconfigure the interface. In the example, a display processor 702 generates display data for display 124 (see FIG. 1). Display processor may be integrated with processing circuit 102. Data may be generated for either a MIPI standard Display System Interface (DSI) or for an N-Phase Polarity interface described herein.

When a MIPI DSI interface is configured, display pixel data originating from display processor 702 is provided to MIPI DSI Link Controller 704, which formats the display pixel data into packets to be sent over a high-speed serial interface to Display 124. Both pixel data and control information may be transmitted over this link. A reverse link may be provided for reading status from display 124, or to receive other information.

Data packets generated by MIPI DSI Link Controller 704 in digital core logic circuitry 720 may be provided to MIPI DPHY Pre-Driver 706, which is realized in Pad Ring input/output section 724. The data packets may be provided to a set of output drivers 718 through an electronic switch multiplexer, shown as their separate constituents 714 and 716. In one example, the differential drivers 714 may be enabled while drivers 716 may be disabled. In another example, an electronic switch multiplexer, here represented by an array of switches 726, may select the differential outputs provided by drivers 714.

When N-Phase Polarity encoding is required, the switches 726 may be operated to select an output of buffers 716. Additionally or alternatively, buffers 716 may be enabled while buffers 714 are disabled. In this configuration, data packets generated by MIPI DSI Link Controller 704 may be encoded using an N-Phase Polarity encoder 710 and provided to N-Phase Polarity pre-driver 712. N-Phase Polarity encoder 710 and/or N-Phase Polarity pre-driver 712 may comprise a switching matrix or other logic that determines the number and mapping of wires to be used for N-Phase Polarity encoding. In this context, data packets similar to MIPI DSI packets are sent over an N-Phase Polarity link. Some packets may need to be reformatted to make proper use of symbol groups on the N-Phase Polarity link. For example, the MIPI DSI may be byte-oriented, but the N-Phase Polarity link may transfer 16-bit words at a time, and a byte may be added to odd-length packets. Link synchronization for N-Phase Polarity may also be slightly different.

Data packets generated by N-Phase Polarity Adaptation Link Controller 708 are provided to N-Phase Polarity Encoder 710 to encode groups of link data (for example, 16-bit or 32-bit words) into groups of symbols, and outputs one symbol at a time to N-Phase Polarity Pre-Driver 712. In one example, N-Phase Polarity Adaptation Link Controller 708 may be realized in Digital Core Logic 720, and N-Phase Polarity Encoder 710 may be realized in Pad Ring 724. The pre-driver 712 may amplify received input signals to a level sufficient to drive buffers 716 and/or Output Driver 718.

Switch multiplexer 726 may select either MIPI DPHY Pre-Driver 706 output or N-Phase Polarity Pre-Driver 712 output to be provided to Output Drivers 718. Switch multiplexer 726 may transmit signals having a voltage or current level much lower than the output of Output Drivers 718. Accordingly, the output signals from MIPI DPHY Pre-Driver 706 and/or N-Phase Polarity Pre-Driver 712 may be easily switched on-chip.

The state of the switch multiplexer may be set to a default or preconfigured selection when the system is powered up. Typically, this state need be configured only once because Display 124 may be permanently attached to the processing circuit 102, and consequently it may not be necessary to re-configure the switch multiplexer during normal operation of the system. Switch Multiplexer 726 may be realized as configuration registers. Code for programming the switch multiplexer may be stored in storage 112. The use of switch multiplexer 726 to switch low-level signals permits the same application processor to be used for more than one interface, without the need to duplicate I/O pads or pins. The same I/O pads or pins may therefore be used for more than one interface, where programming of the switch multiplexer need only be performed once per system.

In some embodiments, an M-wire N-phase link controller 708 may provide input data words to data is input to a mapper 302 (see FIG. 3), which maps the input word to a series of symbols to be sent over the bus. The mapper 302 may be embodied in an encoding element 710. One purpose of the mapper 302 is to compute the values of a group of symbols based on an input data word. This is particularly useful if the number of bits per symbol is not an integer. In the simple example described in relation to FIG. 3, a 3-wire system is employed in which there are 3 possible combinations of 2 wires to be driven simultaneously, given that one wire is undriven. There are also 2 possible combinations of polarity for each pair of wires that may be driven, yielding 6 possible states. 5 of the 6 states are usable because a transition is required between any two symbols. With 5 states there may be $\log_2(5) \cong 2.32$ bits per symbol. The mapper may accept a 16-bit word and convert it to 7 symbols.

Figure 8:
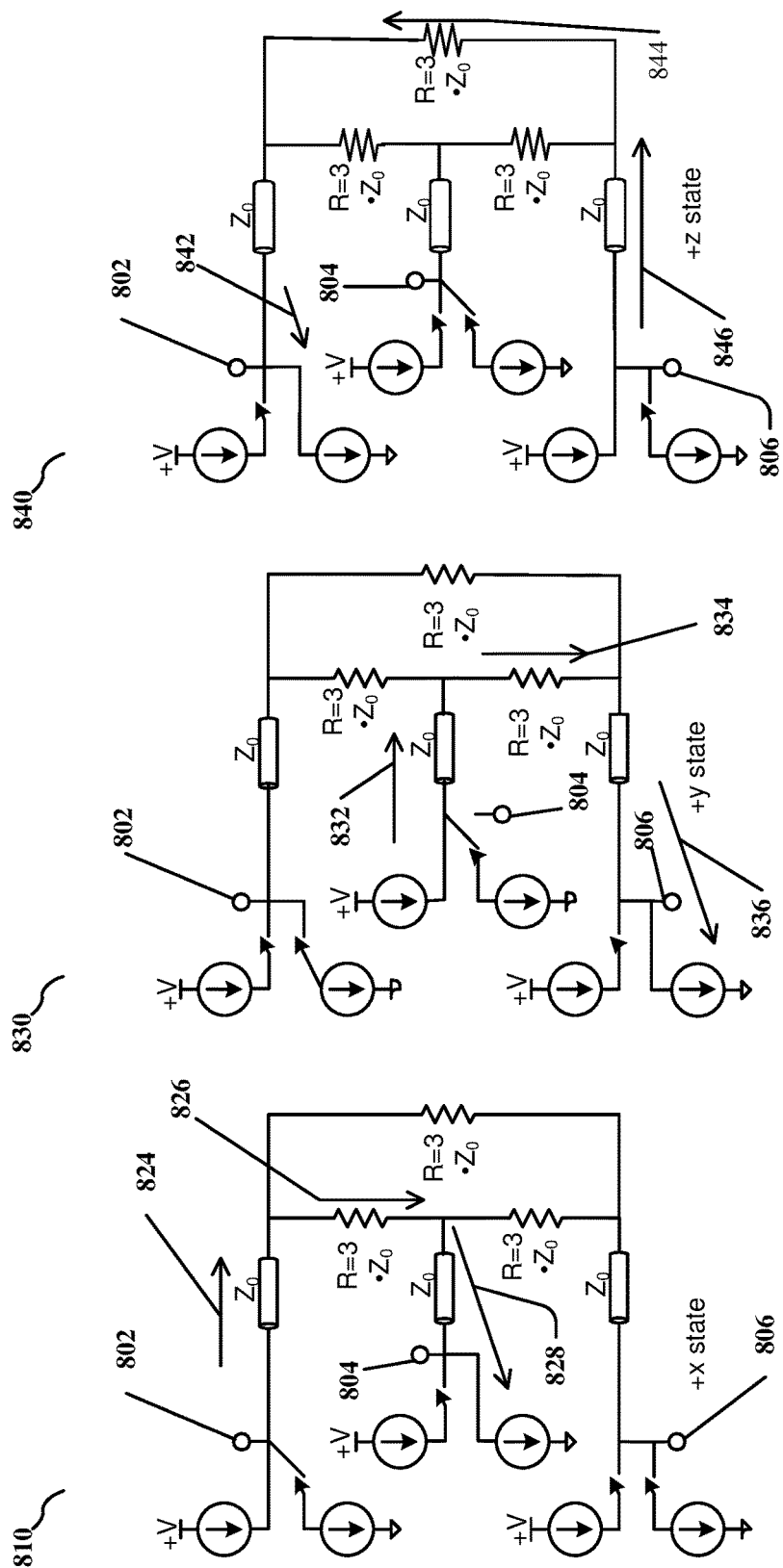
FIG. 8 illustrates a circuit for 3-phase polarity data encoding.

M-wire, N-phase polarity encoding may be understood from the example of a S-wire, 3-phase polarity encoding circuit. As shown in FIG. 8, current is passed through two of three signals measureable at terminals 802, 804, 806, with no current passed through the third signal, when data link 218 is active. Each phase state can have either a positive or negative polarity, although FIG. 8 shows only the positive polarity condition of each phase state to simplify description. To obtain a "+x" state, current is passed 824, 826, and 828 from terminal 802 to terminal 804. To obtain a "+y" state, current is passed 834, 836, and 838 from terminal 804 to terminal 806. To obtain a "+z" state, current is passed 844, 846, and 848 from terminal 806 to terminal 802. The undriven signal is pulled to a neutral voltage by termination resistors at the receiver.

Figure 9:
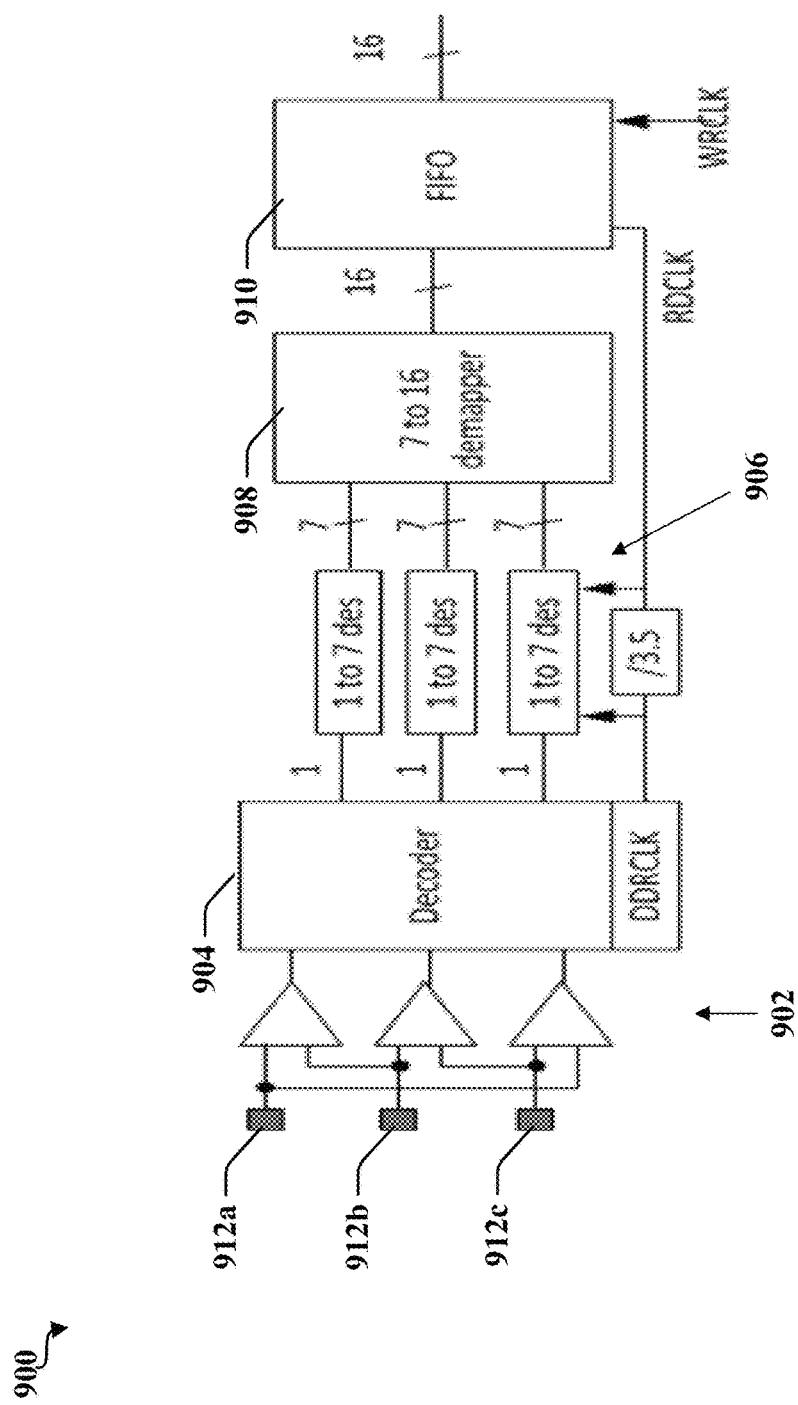
FIG. 9 illustrates a 3-phase polarity data decoder.

FIG. 9 illustrates an example 900 of a receiver in a 3-phase PHY. Comparators 902 and decoder 904 are configured to provide a digital representation of the state of each of three transmission lines 912a, 912b and 912c, as well as the change in the state of the three transmission lines compared to the state transmitted in the previous symbol period. Seven consecutive states are assembled by serial to parallel convertors 906 to produce a set of 7 symbols to be processed by demapper 908 to obtain 16 bits of data that may be buffered in FIFO 1210.

Figure 10:
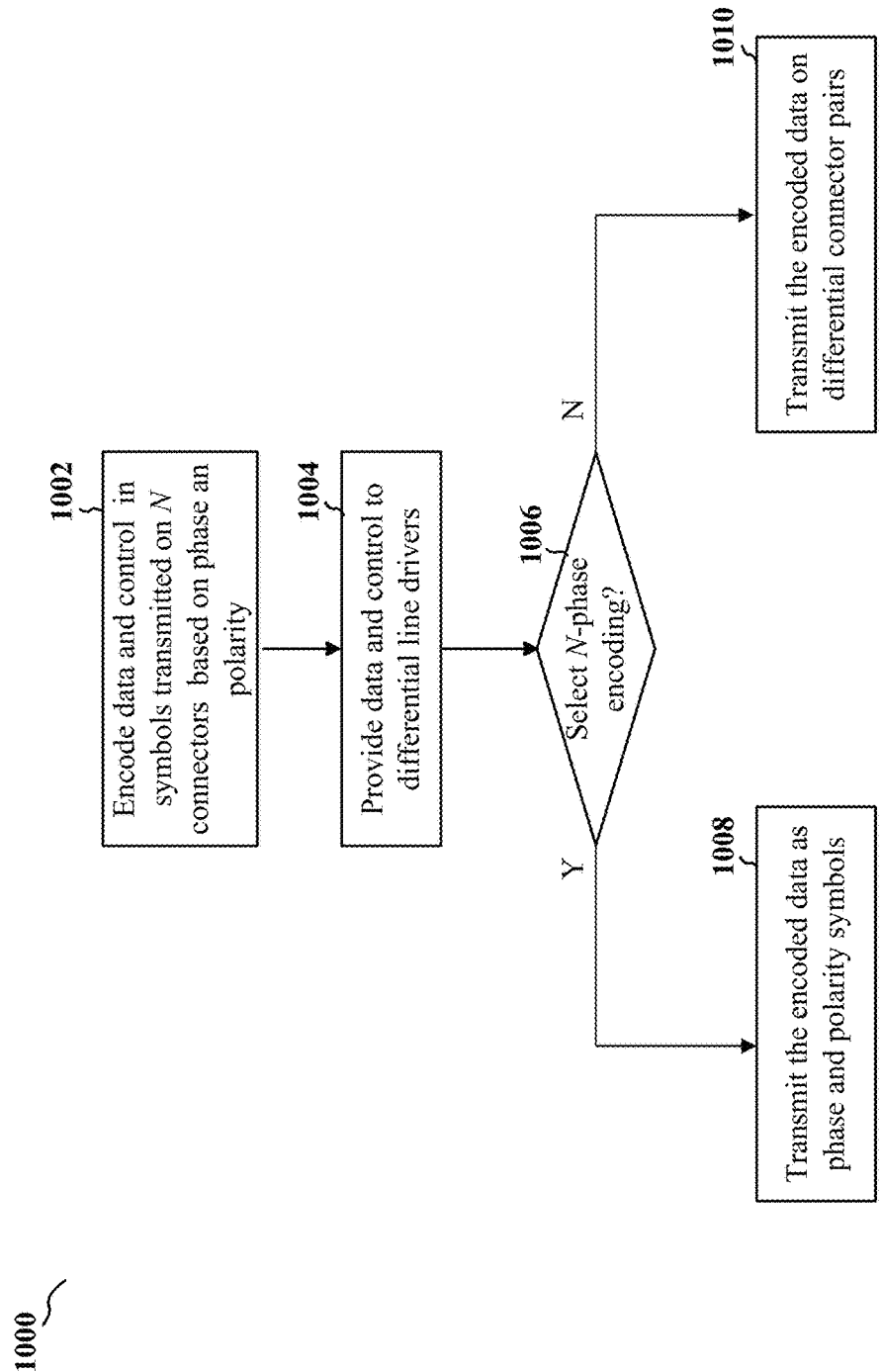
FIG. 10 is a flow chart of a method for selective N-phase polarity encoding.

FIG. 10 is a flowchart illustrating an encoding system according to certain aspects of the invention. At step 1002, data for transmission is encoded in symbols to be transmitted on a plurality of connectors. Each symbol may define a phase state for a first signal carried by a first pair of connectors. Each symbol may define a polarity for a second signal carried by a second pair of connectors. Each symbol may define at least one connector that is undriven. An undriven connector may be in an open-circuit state.

In some embodiments, the data may be encoded in symbols by selecting a next symbol from a set of symbols. The set of symbols may characterize each of all available states of plurality of connectors. For example, each symbol may characterize a combination of phase and polarity for one or more pairs of the connectors. Each state may include at least one connector is not driven or is open-circuited. Typically, two symbols transmitted one immediately after the other are required to be different to ensure that a clock can be extracted from the plurality of connectors.

In some embodiments, the polarity of the second signal is characterized as a voltage differential provided between the second pair of connectors. The polarity of the second signal may be characterized as a direction of current flow through the second pair of connectors. The first signal may have a phase that rotates in one of two directions. Information may be encoded in a change of rotation of the phase between sequential time intervals. In some embodiments, the data may be encoded as one or more differential signals.

In some embodiments, it may be determined at step 1006 whether the data is to be transmitted in packets on differential connections at step 1010, or whether the data should be transmitted as symbols on a N-phase polarity encoded plurality of connectors at step 1008.

In step 1008, the encoded data may be transmitted on the plurality of connectors. Each symbol may be encoded at a transition between successive states of the plurality of connectors. In some embodiments, the polarity of connectors comprises 3 connectors and the first pair of connectors is also the second pair of connectors. Typically, there are more than three connectors in the plurality of connectors and the first pair of connectors is different from the second pair of connectors.

In some embodiments, the plurality of connectors is allocated among two or more sets of connectors. Each set of connectors may encode different data in symbols to be transmitted on the each set of connectors. One set of connectors may encode input data or output data of a memory device. Another set of connectors may encode control signals for the memory device.

Figure 11:
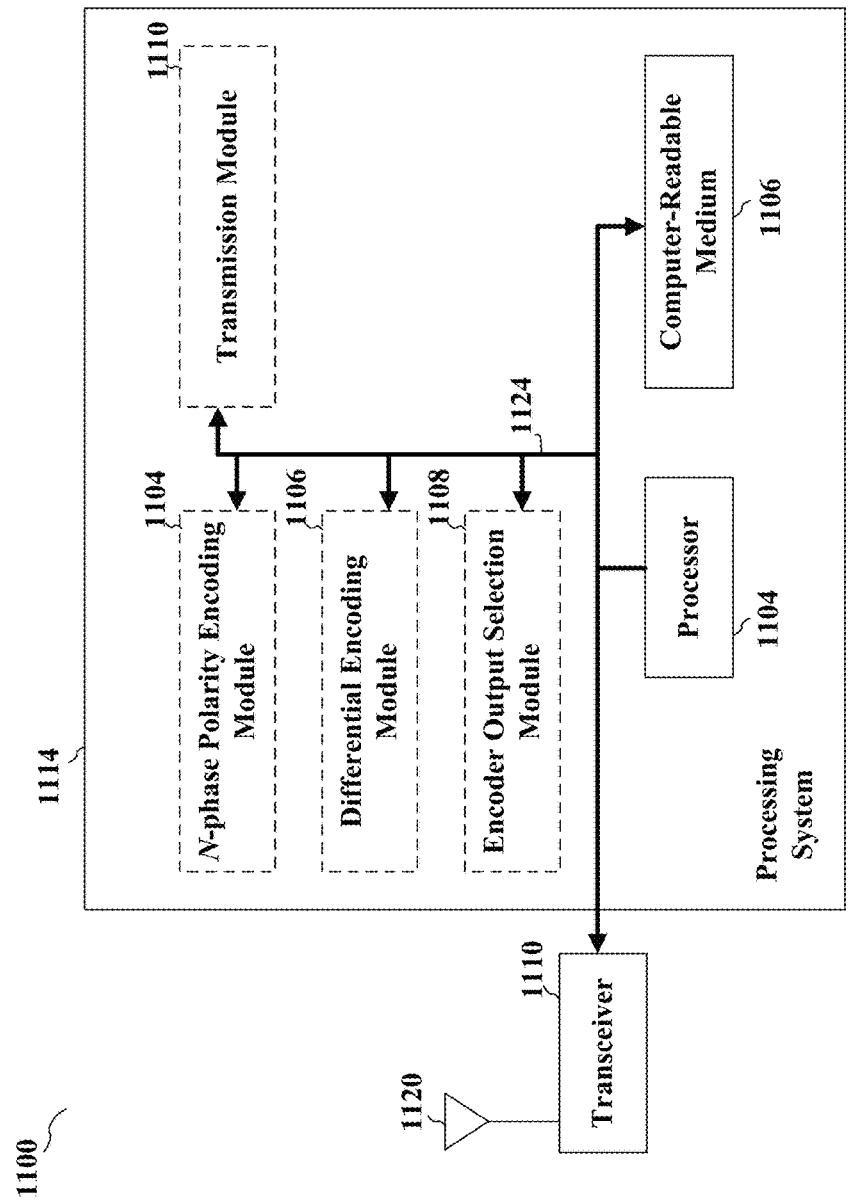
FIG. 11 is a diagram illustrating an example of a hardware implementation for an apparatus employing N-phase polarity data encoding.

FIG. 11 is a diagram 1100 illustrating an example of a hardware implementation for an apparatus employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1104, 1106, 1108 and 1110 and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1104, 1106, 1108 and 1110. The modules may be software modules running in the processor 1104, resident/stored in the computer readable medium 1106, one or more hardware modules coupled to the processor 1104, or some combination thereof.

In one configuration, the apparatus 1102 for wireless communication includes means 1104 for encoding data in symbols to be transmitted on a plurality of connectors, means 1106 for encoding the data as one or more differential signals, means 1108 for selecting one of the encoding means to provide encoded data for output, and means 1110 for transmitting the encoded data on the plurality of connectors. The aforementioned means may be one or more of the aforementioned modules of the apparatus 1102 and/or the processing system 1114 of the apparatus 1102 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A data transfer method performed at a controller device coupled to a plurality of connectors, comprising:

encoding at the controller device a plurality of data signals in a first sequence of symbols and a plurality of control signals used to control a memory device in a second sequence of symbols, the first sequence of symbols and the second sequence of symbols configured to be transmitted on the plurality of connectors when transmitting data to the memory device, wherein each symbol of the first sequence and the second sequence of symbols is transmitted using a combination of a phase state of a first pair of connectors of the plurality of connectors, a polarity of a second pair of connectors of the plurality of connectors, and a selection of at least one undriven connector of the plurality of connectors;

transmitting by the controller device the first sequence of symbols on a first set of connectors allocated from the plurality of connectors and the second sequence of symbols on a second set of connectors allocated from the plurality of connectors, wherein said transmission of said each symbol of the first sequence and the second sequence of symbols causes a change of state for at least one of the plurality of connectors;

decoding at the controller device the plurality of data signals from a third sequence of symbols received from the first set of connectors, after a fourth sequence of symbols encoding the plurality of control signals and the fourth sequence of symbols is transmitted on the second set of connectors;

determining whether the plurality of connectors is configured for multi-phase polarity encoding, wherein the first, the second, the third and the fourth sequences of symbols are transmitted if it is determined that the plurality of connectors is configured for the multi-phase polarity encoding; and transmitting the plurality of the data signals and the plurality of the control signals as differential signals on the plurality of connectors if it is determined that the plurality of connectors is not configured for the multi-phase polarity encoding.

2. The method of claim 1, wherein a clock associated with the plurality of control signals and data signals of the memory device is encoded in a transmission timing of at least one of the first, the second, the third and the fourth sequences of symbols.

3. The method of claim 1, wherein the polarity of the second pair of connectors is characterized as a voltage differential provided between the second pair of connectors.

4. The method of claim 1, wherein the polarity of the second pair of connectors is characterized as a direction of current flow through the second pair of connectors.

5. The method of claim 1, wherein for each set of the first set and the second set of connectors a signal that has a phase that rotates in one of two directions is transmitted in different phases on each connector of said each set of the first set and the second set of connectors and wherein information is encoded in a change of rotation of the phase between sequential time intervals.

6. The method of claim 1, further comprising:
decoding the plurality of control signals from symbols received from the second set of connectors.

7. The method of claim 6, wherein the second set of connectors comprises at least some bidirectional connectors.

8. The method of claim 1, wherein each set of the first set and the second set of connectors allocated from the plurality of connectors separately encodes different portions of the plurality of data signals and the plurality of control signals.

9. The method of claim 8, wherein the first, the second, the third and the fourth sequences of symbols encoding the plurality of data signals and the plurality of control signals are transmitted on four or more connectors of the plurality of connectors.

10. The method of claim 1, and further comprising:
transmitting a synchronization word after said transmitting the first sequence of symbols and the second sequence of symbols and before the third sequence of symbols is received.

11. An apparatus, comprising:
means for encoding at a controller device a plurality of data signals in a first sequence of symbols and a plurality of control signals used to control a memory device in a second sequence of symbols, the first sequence of symbols and the second sequence of symbols configured to be transmitted on a plurality of connectors, wherein each symbol of the first sequence and the second sequence of symbols is transmitted using a combination of a phase state of a first pair of connectors of the plurality of connectors, a polarity of a second pair of connectors of the plurality of connectors, and a selection of at least one undriven connector of the plurality of connectors;
means for transmitting by the controller device the first sequence of symbols on a first set of connectors allocated from the plurality of connectors and the second sequence of symbols on a second set of connectors allocated from the plurality of connectors, wherein said transmission of said each symbol of the first sequence and the second sequence of symbols causes a change of state for at least one of the plurality of connectors;
means for decoding at the controller device the plurality of data signals from a third sequence of symbols received from the first set of connectors, after a fourth sequence of symbols encoding the plurality of control signals is transmitted on the second set of connectors; and
means for determining whether the plurality of connectors is configured for multi-phase polarity encoding, wherein the means for transmitting comprises a switch that selects the first, the second, the third and the fourth sequence of symbols for transmission if it is determined that the plurality of connectors is configured for the multi-phase polarity encoding, and that transmits differentially-driven versions of the plurality of the data signals and the plurality of the control signals to the plurality of connectors if it is determined that the plurality of connectors is not configured for the multi-phase polarity encoding.

12. The apparatus of claim 11, wherein a clock associated with the plurality of control and data signals of the memory device is encoded in a transmission timing of at least one of the first, the second, the third and the fourth sequences of symbols.

13. The apparatus of claim 11, wherein the polarity of the second pair of connectors is characterized as a voltage differential provided between the second pair of connectors.

14. The apparatus of claim 11, wherein the polarity of the second pair of connectors is characterized as a direction of current flow through the second pair of connectors.

15. The apparatus of claim 11, wherein for each set of the first set and the second set of connectors a signal that has a phase that rotates in one of two directions is transmitted in different phases on each connector of said each set of the first set and the second set of connectors, and wherein information is encoded in a change of rotation of the phase between sequential time intervals.

16. The apparatus of claim 11, further comprising:
means for decoding the plurality of control signals from symbols received from the second set of connectors.

17. The apparatus of claim 16, wherein the second set of connectors comprises at least some bidirectional connectors.

18. The apparatus of claim 11, wherein each set of connectors allocated from the plurality of connectors separately encodes different portions of the plurality of data signals and the plurality of control signals.

19. The apparatus of claim 18, wherein the first, the second, the third and the fourth sequences of symbols encoding the plurality of data signals and the plurality of control signals are transmitted on four or more connectors of the plurality of connectors.

20. The apparatus of claim 11, and further comprising:
means for transmitting a synchronization word after said transmitting the first sequence of symbols and the second sequence of symbols and before the third sequence of symbols is received.

21. An apparatus, comprising:
a processing system configured to:
encode at a controller device a plurality of data signals in a first sequence of symbols and a plurality of control signals used to control a memory device in a second sequence of symbols, the first sequence of symbols and the second sequence of symbols configured to be transmitted on a plurality of connectors when transmitting data to the memory device, wherein each symbol of the first sequence and the second sequence of symbols is transmitted using a combination of a phase state of a first pair of connectors of the plurality of connectors, a polarity of a second pair of connectors of the plurality of connectors, and a selection of at least one undriven connector of the plurality of connectors;
transmit the first sequence of symbols on a first set of connectors allocated from the plurality of connectors and the second sequence of symbols on a second set of connectors allocated from the plurality of connectors, wherein said transmission of said each symbol of the first sequence and the second sequence of symbols causes a change of state for at least one of the plurality of connectors; and decode the plurality of data signals from a third sequence of symbols received from the first set of connectors, after a fourth sequence of symbols encoding the plurality of control signals is transmitted on the second set of connectors;

determine whether the plurality of connectors is configured for multi-phase polarity encoding, wherein the first, the second, the third and the fourth sequence of symbols are transmitted if it is determined that the plurality of connectors is configured for the multi-phase polarity encoding; and transmit the plurality of data signals and the plurality of control signals as differential signals on the plurality of connectors if it is determined that the plurality of connectors is not configured for the multi-phase polarity encoding.

22. The apparatus of claim 21, wherein a clock associated with the plurality of control and data signals of the memory device is encoded in a transmission timing of the first, the second, the third and the fourth sequences of symbols.

23. The apparatus of claim 21, wherein the polarity of the second pair of connectors is characterized as a voltage differential provided between the second pair of connectors.

24. The apparatus of claim 21, wherein the polarity of the second pair of connectors is characterized as a direction of current flow through the second pair of connectors.

25. The apparatus of claim 21, wherein for each set of the first and the second set of connectors a signal that has a phase that rotates in one of two directions is transmitted in different phases on each connector of said each set of the first and the second set of connectors, and wherein information is encoded in a change of rotation of the phase between sequential time intervals.

26. The apparatus of claim 21, wherein the processing system is configured to:

decode the plurality of control signals from symbols received from the second set of connectors.

27. The apparatus of claim 26, wherein the second set of connectors comprises at least some bidirectional connectors.

28. The apparatus of claim 21, wherein each set of connectors allocated from the plurality of connectors separately encodes different portions of the plurality of data signals and the plurality of control signals.

29. The apparatus of claim 28, wherein the first, the second, the third and the fourth sequences of symbols encoding the plurality of data signals and the plurality of the control signals are transmitted on four or more connectors of the plurality of connectors.

30. The apparatus of claim 21, wherein the processing system is configured to:

transmit a synchronization word after said transmitting the first sequence of symbols and the second sequence of symbols and before the third sequence of symbols is received.

31. A non-transitory processor-readable storage medium having one or more instructions which, when executed by at least one processing circuit, cause the at least one processing circuit to:

encode at a controller device a plurality of data signals in a first sequence of symbols and a plurality of control signals used to control a memory device in a second sequence of symbols, the first sequence of symbols and the second sequence of symbols configured to be transmitted on a plurality of connectors when transmitting data to the memory device, wherein each symbol of the first sequence and the second sequence of symbols is transmitted using a combination of a phase state of a first pair of connectors of the plurality of connectors, a polarity of a second pair of connectors of the plurality of connectors, and a selection of at least one undriven connector of the plurality of connectors;

transmit the first sequence of symbols on a first set of connectors allocated from the plurality of connectors and the second sequence of symbols on a second set of connectors allocated from the plurality of connectors, wherein said transmission of each symbol of the first sequence and the second sequence of symbols causes a change of state for at least one of the plurality of connectors;

decode the plurality of data signals from a third sequence of symbols received from the first set of connectors, after a fourth sequence of symbols encoding the plurality of control signals is transmitted on the second set of connectors; and determine whether the plurality of connectors is configured for multi-phase polarity encoding, wherein the first, the second, the third and the fourth sequences of symbols are transmitted if it is determined that the plurality of connectors is configured for the multi-phase polarity encoding; and transmit the plurality of the data signals and the plurality of the control signals as differential signals on the plurality of connectors if it is determined that the plurality of connectors is not configured for the multi-phase polarity encoding.

32. The processor-readable storage medium of claim 31, wherein a clock associated with the plurality of control and data signals of the memory device is encoded in a transmission timing of the first, the second, the third and the fourth sequences of symbols.

33. The processor-readable storage medium of claim 31, wherein the polarity of the second pair of connectors is characterized as a voltage differential provided between the second pair of connectors.

34. The processor-readable storage medium of claim 31, wherein the polarity of the second pair of connectors is characterized as a direction of current flow through the second pair of connectors.

35. The processor-readable storage medium of claim 31, wherein for each set of the first and the second set of connectors a signal that has a phase that rotates in one of two directions is transmitted in different phases on each connector of said each set of the first and the second set of connectors, and wherein information is encoded in a change of rotation of the phase between sequential time intervals.

36. The processor-readable storage medium of claim 31, wherein the one or more instructions, when executed by at least one processing circuit, cause the at least one processing circuit to:

decode the plurality of control signals from symbols received from the second set of the plurality of connectors.

37. The processor-readable storage medium of claim 36, wherein the second set of connectors comprises at least some bidirectional connectors.

38. The processor-readable storage medium of claim 31, wherein each set of connectors allocated from the plurality of connectors separately encodes different portions of the plurality of the data signals and the plurality of the control signals.

39. The processor-readable storage medium of claim 38, wherein the first, the second, the third and the fourth sequences of symbols encoding the plurality of the data signals and the plurality of the control signals are transmitted on four or more connectors of the plurality of connectors.

40. The processor-readable storage medium of claim 31, wherein the one or more instructions, when executed by at least one processing circuit, cause the at least one processing circuit to:
   transmit a synchronization word after said transmitting the first sequence of symbols and the second sequence of symbols and before the third sequence of symbols is received.

* * * * *